United States Patent [19]

Leslie

[11] Patent Number: 4,801,659

[45] Date of Patent: Jan. 31, 1989

[54] ORGANOPOLYSILOXANES EXHIBITING NONLINEAR OPTICAL RESPONSE

[75] Inventor: Thomas M. Leslie, Clinton Township, Hunterdon County, N.J.

[73] Assignee: Hoechst Celanese Corp., Somerville, N.J.

[21] Appl. No.: 923,501

[22] Filed: Oct. 27, 1986

[51] Int. Cl.$^4$ .................................................. C08F 283/00
[52] U.S. Cl. ...................................... 525/479; 252/582; 252/299.01; 307/425; 350/311; 556/413; 556/422; 556/445; 556/450
[58] Field of Search .................. 528/25, 28, 31, 32, 528/15; 525/474, 479; 252/582, 299.01; 307/425; 350/311; 556/413, 422, 445, 450

[56] References Cited

U.S. PATENT DOCUMENTS

| | | | |
|---|---|---|---|
| 2,970,150 | 1/1961 | Bailey | 528/32 |
| 3,153,662 | 10/1964 | Pike | 528/31 |
| 4,694,066 | 9/1987 | DeMartino | 528/373 |

Primary Examiner—Matthew A. Thexton
Assistant Examiner—Catherine S. Kilby
Attorney, Agent, or Firm—Depaoli & O'Brien

[57] ABSTRACT

In a preferred embodiment this invention provides novel organopolysiloxanes which exhibit nonlinear optical response.

Illustrative of an invention organopolysiloxane is a polymer corresponding to the formula:

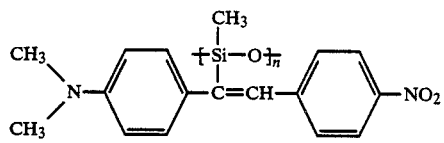

where n is an integer of at least 5.

22 Claims, No Drawings

ORGANOPOLYSILOXANES EXHIBITING NONLINEAR OPTICAL RESPONSE

This invention was made with Government support under Contract Number F49620-84-0110 awarded by the Department of Defense. The Federal Government has certain rights in this invention.

BACKGROUND OF THE INVENTION

It is known that organic compounds and polymeric materials with large delocalized $\pi$-electron systems can exhibit nonlinear optical response, which in many cases is a much larger response than by inorganic substrates.

In addition, the properties of organic compounds and polymeric materials can be varied to optimize other desirable properties, such as mechanical and thermoxidative stability and high laser damage threshold, with preservation of the electronic interactions responsible for nonlinear optical effects.

Thin films of organic compounds or polymeric materials with large second order nonlinearities in combination with electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic compounds and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above recited publications are incorporated herein by reference.

Prior art of interest with respect to the present invention are publications relating to organopolysiloxane synthesis such as U.S. Pat. Nos. 2,716,128; 2,970,150; 3,159,662; 3,483,270; 3,694,478; 4,166,078; 4,336,364; 4,370,365; 4,465,818; 4,472,563; and 4,578,494.

Of particular interest are publications which describe organopolysiloxanes containing olefinically unsaturated substituents, such as U.S. Pat. Nos. 3,498,945; 3,932,555; 4,077,937; and 4,530,989.

Of related interest are publications which describe organopolysiloxanes having mesogenic side chain substituents, such as U.S. Pat. No. 4,358,391 and 4,410,570.

There is continuing interest in the development of organopolysiloxane polymers which exhibit exceptional properties for specialized applications.

There is also a growing interest in the development of new nonlinear optical organic media for prospective novel phenomena and devices adapted for laser frequency conversion, information control in optical circuitry, light valves and optical switches. The potential utility of organic materials with large second-order and third-order nonlinearities for very high frequency application contrasts with the bandwidth limitations of conventional inorganic electrooptic materials.

Accordingly, it is an object of this invention to provide novel organopolysiloxane polymers.

It is another object of this invention to provide organopolysiloxane polymers which exhibit nonlinear optical properties.

It is another object of this invention to provide novel nonlinear optical organic media.

It is another object of this invention to provide optical devices having a nonlinear optical component comprising a transparent solid medium of a novel organopolysiloxane.

It is a further object of this invention to provide novel compositions which are physical blends of an organopolysiloxane component and a liquid crystalline component.

Other objects and advantages of the present invention shall become apparent from the accompanying description and examples.

This patent application is related to copending patent application Ser. No. 923,507 (CEL-86-60), filed Oct. 27, 1986.

DESCRIPTION OF THE INVENTION

One or more objects of the present invention are accomplished by the provision of a polysiloxane which is characterized by a recurring structural unit corresponding to the formula:

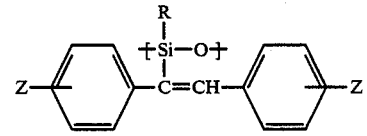

where R is an inorganic substituent or an organic substituent containing between about 1–12 carbon atoms; Z is a substituent selected from hydrogen and electron-donating and electron-withdrawing substituents; and the polysiloxane contains between about 2–2000 silicon atoms.

Illustrative of R inorganic substituents are chlorine, fluorine, bromine, nitro, amino, hydroxyl, thiolo, and the like.

Illustrative of R organic substituents are aliphatic, alicyclic and aromatic radicals such as methyl, trifluoromethyl, butyl, isobutyl, butenyl, ethoxyethyl, fluorohexyl, decyl, cyclopentyl, cyclohexenyl, phenyl, tolyl, benzyl, naphthyl, piperidyl, pyridyl, pyrazyl, and the like.

In another embodiment this invention provides a polymer which is characterized by a recurring structural unit corresponding to the formula:

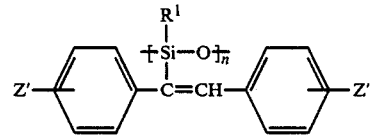

where $R^1$ is a hydrocarbyl substituent containing between about 1–12 carbon atoms; n is an integer of at least 5; and Z' is an electron-donating or electron-withdrawing substituent.

When the polymer is a copolymer, preferably the above recurring structural units comprise at least about 25 weight percent of the copolymer. Illustrative of other recurring comonomeric units are dialkylsiloxyl, diarylsiloxyl, dialkylsilazanyl, oxyalkylene, and the like. The copolymer can have alternating comonomeric units, or be in the form of block copolymers with block units of the type described in U.S. Pat. Nos. 3,483,270 and 4,586,997.

In another embodiment this invention provides a polymer which is characterized by a recurring structural unit corresponding to the formula:

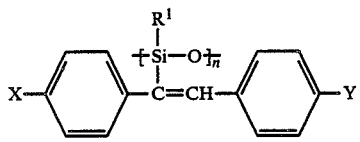

where $R^1$ is a hydrocarbyl substituent containing between about 1–12 carbon atoms; n is an integer of at least 5; X is an electron-donating substituent; and Y is an electron-withdrawing substituent.

Illustrative of $R^1$ substituents are $C_1$–$C_4$ alkyl groups and $C_6$–$C_{10}$ aryl groups, such as methyl and phenyl radicals.

The term "electron-donating" as employed herein refers to organic substituents which contribute electron density to the $\pi$-electron system when the conjugated electronic structure is polarized by the input of electromagnetic energy.

The term "electron-withdrawing" as employed herein refers to electronegative organic substituents which attract electron density from the $\pi$-electron system when the conjugated electronic structure is polarized by the input of electromagnetic energy.

Illustrative of electron-donating substituents as represented by Z, Z' or X in the above formulae are amino, alkylamino, dialkylamino, 1-piperidyl, 1-piperazyl, 1-pyrrolidyl, acylamino, hydroxyl, thiolo, alkylthio, arylthio, acyloxy, halo, $C_1$–$C_{30}$ hydrocarbyl, $C_1$–$C_{30}$ hydrocarbyloxy, $C_1$–$C_{30}$ hydrocarbylthio, and the like.

Illustrative of electron-withdrawing substituents as represented by Z,Z' or Y in the above formulae are nitro, cyano, trifluoromethyl, acyl, carboxy, alkanoyloxy, aroyloxy, carboxamido, alkoxysulfonyl, aryloxysulfonyl, and the like.

In another embodiment this invention provides a thermoplastic polymer which is characterized by a recurring structural unit corresponding to the formula:

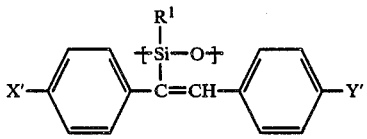

where $R^1$ is a hydrocarbyl substituent containing between about 1–12 carbon atoms; X' is a $C_1$–$C_{30}$ alkyl, alkoxy or alkylthio substituent; Y' is a substituent selected from nitro, cyano and trifluoromethyl groups; and the polymer contains between about 5–2000 silicon atoms.

In another embodiment this invention provides a thermoplastic polymer which is characterized by a recurring structural unit corresponding to the formula:

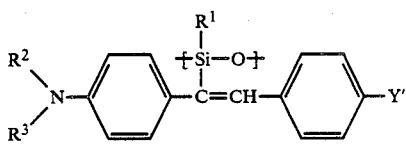

where $R^1$ is a hydrocarbyl substituent containing between about 1–12 carbon atoms; $R^2$ and $R^3$ are selected from hydrogen and $C_1$–$C_{30}$ alkyl groups, and $R^2$ and $R^3$ taken with the connecting nitrogen atom form a heterocyclic substituent; Y' is a substituent selected from nitro, cyano and trifluoromethyl groups; and the polymer contains between about 5–2000 silicon atoms.

Illustrative of a heterocyclic structure formed by $R^2$ and $R^3$ taken together with the connecting nitrogen atom is pyrrolidyl, imidazolidyl, oxazolidyl, thiazolidyl, and the like.

Illustrative of specific organopolysiloxanes of the present invention are polymers represented by the following recurring structural units, wherein the polymers have a weight average molecular weight between about 2000–100,000:

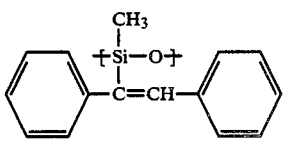

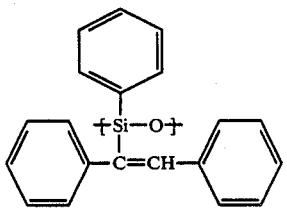

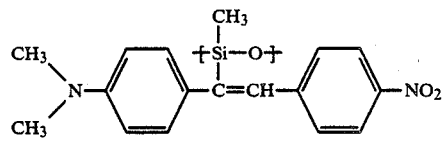

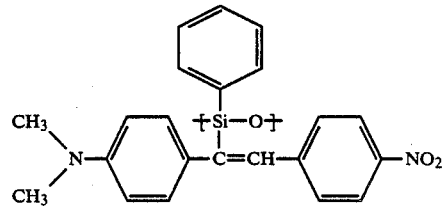

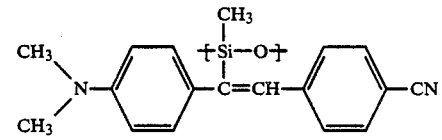

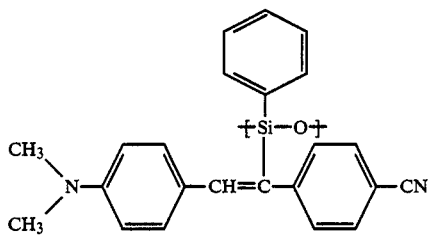

In another embodiment this invention provides a nonlinear optical medium comprising a noncentrosymmetric configuration of polymer molecules characterized by a recurring structural unit corresponding to the formula:

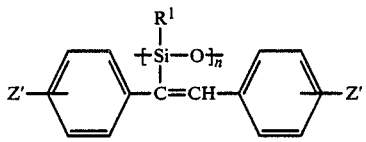

where $R^1$ is a hydrocarbyl substituent containing between about 1–12 carbon atoms; n is an integer of at least 5; and $Z'$ is an electron-donating or electron-withdrawing substituent.

Depending on the nature of the $Z'$ substituents in the above polysiloxane formula, the nonlinear optical medium can exhibit a second order nonlinear optical response. Illustrative of a second order nonlinear optical response is an optical susceptibility $\chi^{(2)}$ of about $1\times 10^{-7}$ esu at 1.91 μm, and a Miller's Delta of about one square meter/coulomb.

The term "Miller's delta" as employed herein with respect to second harmonic generation (SHG) is defined by an equation as elaborated by Garito et al in Chapter 1, "Molecular Optics:Nonlinear Optical Properties Of Organic And Polymeric Crystals"; *ACS Symposium Series* 233 (1983).

The quantity "delta" (δ) is defined by the equation:

$$d_{ijk} = \epsilon_o \chi_{ii}^{(1)} \chi_{jj}^{(1)} \chi_{kk}^{(1)} \delta_{ijk}$$

where terms such as $$\chi_{ii}^{(1)}$$

linear susceptibility components, and $d_{ijk}$, the second harmonic coefficient, is defined through $$\chi_{ijk}^{(2)}(-2\omega;\omega,\omega) = 2\,d_{ijk}(-2\omega;\omega,\omega)$$

The Miller's delta ($10^{-2}$ m²/c at 1.06 μm) of various nonlinear optical crystalline substrates are illustrated by KDP(3.5), LiNbO₃(7.5), GaAs(1.8) and 2-methyl-4-nitroaniline(160).

In another embodiment this invention provides a nonlinear optical medium comprising a centrosymmetric configuration of polymer molecules characterized by a recurring structural unit corresponding to the formula:

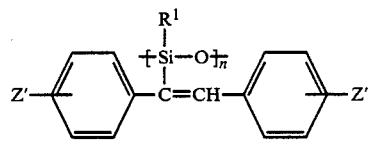

where $R^1$ is a hydrocarbyl substituent containing between about 1–12 carbon atoms; n is an integer of at least 5; and $Z'$ is an electron-donating or electron-withdrawing substituent.

A nonlinear optical medium with a centrosymmetric molecular configuration as defined above exhibits a third order nonlinear optical response. Illustrative of a third order nonlinear optical response is an optical susceptibility $\chi^{(3)}$ of about $1\times 10^{-12}$ esu at 1.91 μm.

In another embodiment this invention provides an optical device, e.g., an electrooptic light modulator, with an organic nonlinear optical component comprising a transparent solid medium of a polymer which is characterized by a recurring structural unit corresponding to the formula:

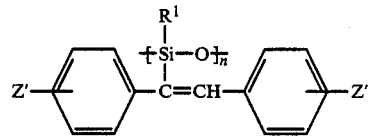

where $R^1$ is a hydrocarbyl substituent containing between about 1–12 carbon atoms; n is an integer of at least 5; and $Z'$ is an electron-donating or electron-withdrawing substituent.

The term "transparent" as employed herein refers to an optical medium which is transparent or light transmitting with respect to incident fundamental light frequencies and created light frequencies. In a nonlinear optical device, a present invention nonlinear optical medium is transparent to both the incident and exit light frequencies.

Synthesis Of Organopolysiloxanes

A present invention organopolysiloxane polymer can be prepared by the reaction of a selected organosilicon structure having a silicon-bonded hydrogen atom with a selected acetylenic compound in the presence of a hydrosilylation catalyst:

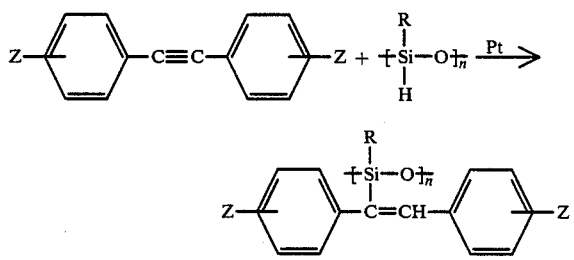

The use of a platinum catalyst to promote the condensation of a silanic hydrogen-bonded siloxane with an unsaturated compound is described in U.S. Pat. Nos. 2,970,150; 3,159,662; 4,077,937; and 4,530,989.

Organohydrogenpolysiloxanes are prepared in a general procedure as described in U.S. Pat. No. 4,370,365 by the hydrolysis of one or more organohalosilanes having silicon-bonded hydrogen such as methyldichlorosilane, followed by condensation of the hydrolysis product.

The acetylenic starting material utilized for preparation of the present organopolysiloxanes can be synthesized by conventional procedures, such as by employing benzoin or cinnamic acid type of intermediates in the manner described in Organic Synthesis, coll. vol. III, 786 (1955) and coll. vol. IV, 857 (1963).

The following flow diagram illustrates a reaction scheme for synthesis of an acetylene monomer:

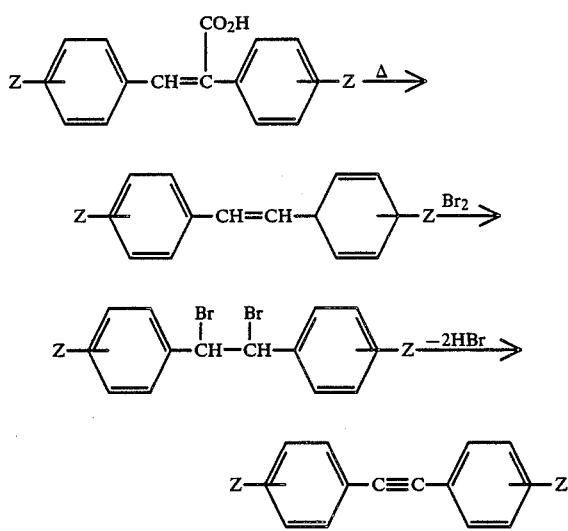

Blends Of Polysiloxane And Liquid Crystalline Components

In another embodiment this invention provides a composition which is a blend of components comprising:

(a) a polysiloxane component which is characterized by a recurring structural unit corresponding to the formula:

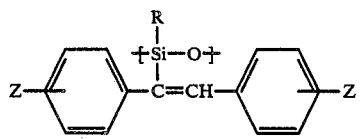

where R is an substituent or an organic substituent containing between about 1–12 carbon atoms; Z is a substituent selected from hydrogen and an electron-donating and electron-withdrawing substituents; and the polysiloxane contains between about 2–2000 silicon atoms; and (b) a liquid crystalline component.

In another embodiment this invention provides a thermoplastic composition which is a blend of components comprising:

(a) a polysiloxane component which is characterized by a recurring structural unit corresponding to the formula:

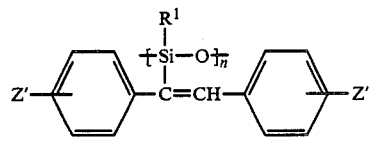

where $R^1$ is a hydrocarbyl substituent containing between about 1–12 carbon atoms; n is an integer of at least 5; and Z' is an electron-donating or electron-withdrawing substituent; and (b) a liquid crystalline component.

Characteristic of an invention composition is a blend which has a glass transition temperature above about 40° C., and exhibits nonlinear optical response.

The proportion of polysiloxane component in the composition can vary between about 10–90 weight percent of the total weight of components.

The liquid crystalline component can be a low molecular weight compound or an oligomeric or polymeric liquid crystal.

A liquid crystalline polymer component can be either a main chain or side chain liquid crystalline polymer. Illustrative of a liquid crystalline polymer component is a thermotropic liquid crystalline polymer containing recurring benzimidazole, benzthiazole or benzoxazole structures.

The polysiloxane component and/or the liquid crystalline component of an invention composition blend can exhibit nonlinear optical response.

An invention composition can be prepared by physically blending the two components, such as when both of the components are solids at ambient temperature. A solid admixture can be homogenized further by melting the physical blend, and then cooling to solidify the melt phase in the form of an organic alloy.

An invention composition also can be prepared by dissolving the polysiloxane and liquid crystalline components in an organic solvent and then removing the solvent medium to provide the composition blend.

An organic solvent solution of a composition can be utilized to cast films or to coat optical substrates. Suitable organic solvents include benzene, toluene, chloroform, tetrahydrofuran, N,N-dimethylformamide, N,N-dimethylacetamide, dimethylsulfoxide, N-methyl-2-pyrrolidone, and the like.

A spinning dope of an invention composition can be prepared and employed for the production of fibers. An invention composition in a molten state can be employed for molding or extruding of shaped articles.

In another embodiment this invention provides a composition which is a blend of components comprising:

(a) a polysiloxane component which is characterized by a recurring structural unit corresponding to the formula:

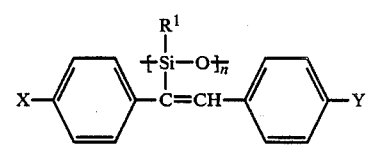

where $R^1$ is a hydrocarbyl substitutent containing between about 1–12 carbon atoms; n is an integer of at least 5: X is an electron-donating substituent; and Y is an electron-withdrawing substituent; and (b) a liquid crystalline polymer component which is characterized by a recurring wholly aromatic structural unit corresponding to the formula:

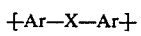

where X is a divalent radical selected from estero, amido, azomethino, azo, azoxy, etheno and ethyno groups, and Ar is a divalent aromatic radical selected from phenylene, naphthylene and diphenylene groups, and aromatic radicals corresponding to the formula:

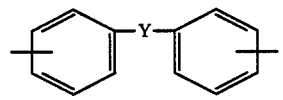

where Y is a carbonyl, sulfono, oxy or thio group.

Illustrative of a wholly aromatic liquid crystalline polymer component is a copolymer of p-hydroxybenzoic acid and 6-hydroxy-2-naphthoic acid.

The term "wholly aromatic" as employed herein refers to a linear thermotropic liquid crystalline polymer in which each recurring monomeric unit contributes at least one aromatic nucleus to the polymer backbone.

The term "thermotropic" as employed herein refers to polymers which are liquid crystalline (i.e., anisotropic) in the melt phase.

Wholly aromatic thermotropic liquid crystalline polymers are disclosed in U.S. Pat. Nos. 3,526,611; 3,991,013; 4,048,148; 4,057,597: 4,066,620; 4,067,852; 4,075,262; 4,083,829; 4,107,143; 4,118,372; 4,122,070; 4,130,545; 4,146,702; 4,153,779; 4,156,070; 4,159,365; 4,161,470; 4,169,933; 4,181,792; 4,184,996; 4,188,476; 4,219,461; 4,224,433 4,230,817; 4,238,598; 4,238,599; 4,256,624; 4,332,759; and 4,381,389; incorporated herein by reference.

In a further embodiment this invention provides a thermoplastic composition which is a blend of components comprising:

(a) a polysiloxane component which is characterized by a recurring structural unit corresponding to the formula:

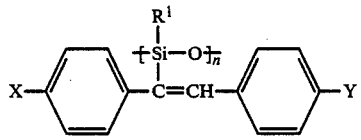

where $R^1$ is a hydrocarbyl substituent containing between about 1-12 carbon atoms; n is an integer of at least 5; X is an electron-donating substituent; and Y is an electron-withdrawing substituent; and (b) a side chain liquid crystalline polymer component which is characterized by a recurring structural unit corresponding to the formula:

where P is a polymer main chain unit, S is a flexible spacer group having a linear chain length of between about 0-20 atoms, M is a pendant mesogen, nd where the pendant mesogens comprise at least about 10 weight percent of the polymer and the polymer has a glass transition temperature above about 60° C.

Side chain liquid crystalline polymers are disclosed in U.S. Pat. Nos. 4,293,435; 4,358,391; and 4,410,570; incorporated herein by reference.

Other literature describing side chain liquid crystalline polymers include J. Polym. Sci., 19, 1427 (1981); Eur. Polym. J., 18, 651 (1982); Polymer, 26, 615 (1985); incorporated herein by reference.

Side chain liquid crystalline polymers exhibiting nonlinear optical response are disclosed in copending patent application Ser. No. 822,090, filed Jan. 24, 1986; incorporated herein by reference.

Liquid crystalline polymer technology is reviewed in "Polymeric Liquid Crystals", (Plenum Publishing Corporation, New York, 1985), and in "Polymer Liquid Crystals" (Academic Press, New York, 1982); incorporated herein by reference.

A present invention composition blend of polysiloxane and liquid crystalline components can be shaped into a centrosymmetric or noncentrosymmetric optical medium such as a transparent film or coating, and employed as an organic nonlinear optical unit in a light modulator device, e.g., a laser frequency converter device.

Nonlinear Optical Properties

The fundamental concepts of nonlinear optics and their relationship to chemical structures can be expressed in terms of dipolar approximation with respect to the polarization induced in an atom or molecule by an external field.

As summarized in the ACS Symposium Series 233 (1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in a liquid crystalline domain:

$$\Delta\mu = \mu_e - \mu_g = \alpha E + \beta EE + \gamma EEE + \quad (1)$$

$$P = P_0 + \chi^{(1)}E + \chi^{(2)}EE + \chi^{(3)}EEE + \quad (2)$$

Light waves passing through an array of molecules can interact with them to produce new waves. This interaction may be interpreted as resulting from a nonlinearity of the induced polymerization. For wholly optical processes such interaction occurs most efficiently when certain phase matching conditions are met, requiring identical propagation speeds of the fundamental wave and the harmonic wave. Birefringent crystals often possess propagation directions in which the refractive index for the fundamental and the second harmonic 2ω are identical so that dispersion may be overcome.

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which the optical medium birefringence cancels the natural dispersion, i.e., the optical transmission of fundamental and second harmonic frequencies is phase matched in the medium. The phase matching can provide a high conversion percentage of the incident light to the second harmonic wave.

For the general case of parametric wave mixing, the phase matching condition is expressed by the relationship:

$$n_1\omega_1 + n_2\omega_2 = n_3\omega_3$$

where $n_1$ and $n_2$ are the indexes of refraction for the incident fundamental radiation, $n_3$ is the index of refraction for the created radiation, $\omega_1$ and $\omega_2$ are the frequencies of the incident fundamental radiation and $\omega_3$ is the frequency of the created radiation. More particularly, for second harmonic generation, wherein $\omega_1$ and $\omega_2$ are the same frequency and $\omega_3$ is the created second harmonic frequency 2ω, the phase matching condition is expressed by the relationship:

$$n_\omega = n_{2\omega}$$

where $n_\omega$ and $n_{2\omega}$ are indexes of refraction for the incident fundamental and created second harmonic light waves, respectively. More detailed theoretical aspects are described in "Quantum Electronics" by A. Yariv, chapters 16-17 (Wiley and Sons, New York, 1975).

A present invention organopolysiloxane alone or in admixture with a liquid crystalline polymer typically is optically transparent and exhibits hyperpolarization tensor properties such as second harmonic and third harmonic generation, and the linear electrooptic (Pockels) effect. For second harmonic generation, the bulk phase of an organopolysiloxane or an admixture with a liquid crystalline polymer whether liquid or solid does not possess a real or orientational average inversion center. The substrate is a macroscopic noncentrosymmetric structure.

Harmonic generation measurements relative to quartz can be performed to establish the value of second order and third order nonlinear susceptibility of the optically clear substrates.

In the case of macroscopic nonlinear optical substrates that are composed of noncentrosymmetric sites on the molecular and domain level, the macroscopic second order nonlinear optical response $\chi^{(2)}$ is comprised of the corresponding molecular nonlinear optical response $\beta$. In the rigid lattice gas approximation, the macroscopic susceptibility $\chi^{(2)}$ is expressed by the following relationship:

$$\chi_{IJK}(-\omega_3; \omega_1, \omega_2) = Nf^{\omega_3}f^{\omega_2}f^{\omega_1} \langle \beta_{ijk}(-\omega_3; \omega_1, \omega_2) \rangle$$

wherein N is the number of sites per unit volume, f represent small local field correlations, $\beta_{ijk}$ is averaged over the unit cell, $\omega_3$ is the frequency of the created optical wave, and $\omega_1$ and $\omega_2$ are the frequencies of the incident fundamental optical waves.

These theoretical considerations are elaborated by Garito et al in chapter 1 of the ACS Symposium Series 233 (1983); and by Lipscomb et al in J. Chem., Phys., 75, 1509 (1981), incorporated by reference. See also Lalama et al, Phys. Rev., A20, 1179 (1979); and Garito et al, Mol. Cryst. and Liq. Cryst., 106, 219 (1984); incorporated by reference.

The microscopic response, or electronic susceptibility $\beta$, and its frequency dependence or dispersion, can be experimentally determined by electric field induced second harmonic generation (DCSHG) measurements of liquid solutions or gases as described in "Dispersion Of The Nonlinear Second Order Optical Susceptibility of Organic Systems", *Physical Review* B, 28 (No. 12), 6766 (1983) by Garito et al, and the Molecular Crystals and Liquid Crystals publication cited above; or by solvatochromism measurements as described in "Nonlinear Optics: A Molecular Basis For Electronic Susceptibility", by Buckley et al, A.C.S. National Meeting, New York, N.Y., Apr. 17, 1986; published in A.C.S. Symposium Series.

In the measurements, the created frequency $\omega_3$ is the second harmonic frequency designated by 2ω, and the fundamental frequencies $\omega_1$ and $\omega_2$ are the same frequency designated by ω. An applied DC field removes the natural center of inversion symmetry of the solution, and the second harmonic signal is measured using the wedge Maker fringe method. The measured polarization at the second harmonic frequency 2ω yields the effective second harmonic susceptibility of the liquid solution an thus the microscopic susceptibility $\beta$ for the molecule.

External Field-Induced Molecular Orientation

In the nonlinear optical media described hereinabove, the centrosymmetric or noncentrosymmetric configuration of polysiloxane molecules alone or in association with liquid crystalline molecules can be external field-induced.

The term "external field" as employed herein refers to an electric, magnetic or mechanical stress field which is applied to a substrate of mobile organic molecules, to induce dipolar alignment of the molecules parallel to the field.

In a melt phase blend of a present invention polysiloxane in admixture with a liquid crystalline component, both types of molecules will align under the influence of an electric or magnetic field. The degree of orientation is determined by the orientational order parameter.

For both nematic and smectic mesophases, the parameter is defined in terms of a director which is a vector parallel to the molecular long axis (and perpendicular to the plane of molecular layering in the case of the smectic mesophase).

If theta is defined as the angle between the director and a chosen axis, then the orientational order parameter is defined as the average over all molecules of the second Legendre polynomial. The parameter ranges from −0.5 to 1.0 (1.0 corresponds to perfect uniaxial alignment along a given axis. 0.0 corresponds to random orientation, and −0.5 corresponds to random orientation confined in a plane perpendicular to a given axis).

The order parameter thus defined does not distinguish between parallel and antiparallel alignment. Thus, a sample of asymmetric rod-like molecules would have an order parameter of 1.0 for both the case in which the molecules are colinear and all pointed in the same direction, and the case in which the molecules are colinear and form antiparallel pairs.

The application of an orienting external field to an array of nematic liquid crystal molecules results in an order parameter of approximately 0.65. Deviations from ideal order. are due to nematic fluctuations on a micron length scale which accommodate characteristic defects. These fluctuations may be dynamic for small molecule liquid crystals or frozen for polymeric liquid crystals.

Smectic liquid crystals may be aligned by application of an orienting external field, with a resulting order parameter exceeding 0.9. Unlike the nematic phase, characteristic defects are removed upon aligning the smectic phase and thereby forming a single liquid crystal phase. Such phases are known as monodomains and, because there are no defects, are optically clear.

For both the nematic and smectic mesophases, application of a DC electric field produces orientation by torque due to the interaction of the applied electric field and the net molecular dipole moment. The molecular dipole moment is due to both the permanent dipole moment (i.e., the separation of fixed positive and negative charge) and the induced dipole moment (i.e., the separation of positive and negative charge by the applied field). The torque which results by the application of a DC electric field normally would only produce very slight alignment even for high dipolar and polarizable molecules at room temperature. The alignment torque is negligible in comparison with the disordering effect of thermally induced rotation (i.e., the Boltzman distribution of rotational eigenstates at room temperature). However, due to the unique associations developed by liquid crystalline molecules throuoh intermolecular forces, long range orientational order on a micron length scale is present. Under these conditions, bulk orientation of the sample by application of aligning fields exceeding a few volts/cm can produce the degrees of alignment indicated above.

Application of an AC electric field also can induce bulk alignment. In this case, orienting torque occurs solely due to the interaction of the applied AC field and the induced dipole moment. Typically, AC field strengths exceeding 1 kV/cm at a frequency exceeding 60 KHz are employed for the nematic phase. At these frequencies, rotational motion of aligned nematic regions is not sufficient to follow the field. As a direct result, torque due to the interaction of the applied field and any permanent dipole moment over time averages to zero. However, electronically induced polarization is a very rapid process so that the induced dipole moment changes direction depending upon the direction of the applied field resulting in a net torque.

Application of a magnetic field also can effect alignment. Organic molecules do not possess a permanent magnetic dipole moment. In a manner analogous to AC electric field, a magnetic field can induce a net magnetic dipole moment Torque results from the interaction of the induced dipole moment and the external magnetic field. Magnetic field strengths exceeding 10 Kgauss are sufficient to induce alignment for a nematic phase or smectic phase.

Alignment of nematics by electric or magnetic fields are accomplished simply by application of the field to the nematic material. Alignment of the smectic phase is more difficult due to a higher viscosity which decreases rotational freedom. Formation of aligned smectic monodomains can be achieved by orienting a material in the nematic phase, and cooling the material into the smectic phase while maintaining the aligning field. For materials which have only smectic and isotropic phases and which lack a nematic phase, alignment can be accomplished in the smectic phase at an elevated temperature near the smectic to isotropic transition temperature, e.g., sufficiently close to the transition temperature so that the medium may contain smectic domains in an isotropic fluid.

Mechanical stress induced alignment is applicable to both the smectic and nematic mesophases. Strong aligning mechanical stress propagates throughout a solid liquid crystalline material due to the natural tendency of these media to self align. Specific mechanical stress methods include stretching a thin film, or coating a composition surface with an aligning polymer such as nylon, polyethylene terephthalate, polyvinyl alcohol, and the like. Physical methods (e.g., stretching) rely upon the rigid and geometrically asymmetric character of certain molecules to induce bulk orientation. Chemical methods (e.g., coating the surface with an aligning polymer) rely upon strong intermolecular interactions to induce surface orientation. All of the methods described above to produce oriented materials generally apply to small molecule and polymeric liquid crystals and polysiloxanes. For polymers which possess a glass transition, the mobile phase of aligned molecules can be frozen by rapid cooling below the glass transition temperature.

In melt phase blends of polysiloxane and liquid crystalline components, the degree and direction of polysiloxane molecular alignment in an external field is influenced directionally by the axial configuration of the liquid crystalline molecules.

Publications relating to external field-induced molecular orientation include The Physics of liquid Crystals, P. G. deGennes, p. 95-97, Oxford University Press, 1974; J. Stamatoff et al, "X-Ray Diffraction Intensities of a Smectic-A Liquid Crystal", *Phys. Rev. Letters*, 44, 1509-1512, 1980; J. S. Patel et al, "A Reliable Method of Alignment for Smectic Liquid Crystals", *Ferroelectrics*, 59, 137-144, 1984; J. Cognard, "Alignment of Nematic Liquid Crystals and Their Mixtures", *Mol. Cryst. Liq. Cryst.*:Suppl., 1982; incorporated herein by reference.

The following examples are further illustrative of the present invention. The components and specific ingredients are presented as being typical, and various modifications can be derived in view of the foregoing disclosure within the scope of the invention.

EXAMPLE I

This Example illustrates the preparation of polymethylhydrosiloxane in accordance with the procedure described in the Journal of High Resolution Chromatography and Chromatography Communications, 8, 516 (1985).

Acetonitrile (2.5 ml) and water (2.5 ml) are added to methyldiethoxysilane (0.033 mole) and dimethyldimethoxysilane (0.033 mole) and the resulting solution is stirred for 1 hour. A solution of benzenesulfonic acid (0.1M in $H_2O$) is added and the mixture is stirred under an argon purge for 26 hours. An excess of hexamethyldisilazane is added and the solution is stirred at 20° C. for 15 minutes. The temperature then is raised to 80° C. for 2 hours to remove the residual disilazane.

The encapped polymer is dissolved in dichloromethane and precipitated with methanol. The fractionation process is repeated twice, and the dissolved polymer is filtered through a millipore filter. A colorless viscous oil remains after solvent evaporation, which has a weight average molecular weight of about 20,000.

EXAMPLE II

This Example illustrates the preparation of 1,2-diphenylethylene compounds.

A.

To a stirred solution of 21.6 grams (0.1 mole) of nitrobenzyl bromide in 50 ml of toluene is added in several portions 26.2 grams (0.1 mole) of triphenyl phosphine. The solution is heated at reflux for one hour, during which time the Wittig salt forms and precipitates from solution. The reaction mixture is cooled to room temperature, and the salt precipitate is filtered from the toluene, washed with fresh toluene to remove any unreacted triphenyl phosphine and 4-nitrobenzyl bromide, and then dried in an open dish.

B.

To a stirred solution of 44 grams of dry potassium carbonate in 500 ml of acetone is added 12.2 grams (0.1 mole) of 4-hydroxybenzaldehyde, and the resultant mixture is heated to reflux temperature. After a refluxing period of a half hour, 17.4 grams of n-octyl bromide (0.09 mole) is added to the mixture. The reaction medium is maintained at reflux for about 20 hours, then the product mixture is cooled to room temperature and potassium salt precipitate is filtered off. The acetone is removed by vacuum distillation, and a residual crude product is recovered. 4-octyloxybenzaldehyde product is purified by distillation under vacuum (bp. 140° C. at 0.1 torr).

C.

To a stirred solution of 30 grams (0.063 mole) of Wittig salt as prepared in step A in 200 ml of dry toluene in a 500 ml flask fitted with a rubber septum, reflux condenser and addition funnel is added 39 ml of n-butyl lithium (0.63 mole) in hexane (1.6M) through the septum using a syringe. The red solution is refluxed for a half hour, and then 14.75 grams of 4-octyloxybenzaldehyde (0.63 mole) as prepared in step B in 50 ml of toluene is added dropwise through the addition funnel.

The mixture is cooled to room temperature and dissolved in ether (500 ml). The resultant solution is extracted four times with distilled water to remove the triphenyl phosphine oxide and lithium bromide salts. The ether solution is dried over anhydrous magnesium sulfate, and after the magnesium sulfate is separated by filtration the ether is removed by vacuum distillation to yield a residual crude product. The 4-octyloxy-4'-nitrodiphenylethylene product is purified by recrystallization from absolute ethanol.

D.

A reaction flask equipped with a stirrer and condenser is charged with 200 ml of N,N-dimethylformamide and 11.2 grams (0.1 mole) of potassium t-butoxide. The flask is sealed and flushed with argon. A 14.6 gram quantity of n-octyl thiol is added to the solution via syringe. The reaction medium is heated at 60° C. for a half hour, then 12.1 grams of 4-fluorobenzaldehyde are added via syringe. The mixture is stirred at 60° C. for 4 hours, and after cooling 300 ml of water are added and the resultant aqueous solution is extracted three times with hexane. The hexane extracts are combined and dried over anhydrous magnesium sulfate. The magnesium sulfate and hexane are removed to yield a residual oil. The crude 4-octylthiobenzaldehyde product is purified by vacuum distillation (b.p. 149° C. at 0.6 torr).

E.

Following the procedure of step C, 15.75 grams of 4-octylthiobenzaldehyde is reacted with 30 grams of Wittig salt to yield 4-octylthio-4'-nitrodiphenylethylene product.

EXAMPLE III

This Example illustrates the preparation of diphenylacetylene compounds.

A.

To a stirred mixture of 90 grams (0.334 mole) of 4-N,N-dimethylamino-4'-nitro-1,2-diphenylethylene in 3 liters of 1,2,3 trichloropropane solvent in a 5 liter three-neck round bottom flask are added 59.0 grams (0.369 mole) of bromine in 200 ml of 1,2,3-trichloropropane over a period of about a half hour. The solution is stirred for one hour, and then 4.1 grams (0.05 mole) of cyclohexene is added to react with any residual bromine. The solvent is removed in vacuo and the residual semi-solid product is washed with hexane to remove any remaining solvent and dibromocyclohexane.

The semi-solid product is dissolved in 3 liters of absolute ethanol, and the solution is charged to a three-neck round bottom flask fitted with a reflux condenser, mechanical stirrer, and 500 ml addition funnel.

A 150 gram (1.336 moles) quantity of potassium t-butoxide is dissolved into 350 ml of absolute ethanol, and the solution is added slowly from the addition funnel to the refluxing solution of dibromodiphenylethane derivative, and the solution is refluxed for a half hour after the addition is completed. When the reaction medium is basic to pH paper, the reaction is stopped. The solution is hot filtered and allowed to cool. Solids are separated from the ethanol solution by filtration, and the ethanol solvent is removed in vacuo to yield a residual solid product. The 4-N,N-dimethylamino-4'-nitrodiphenylacetylene product is recrystallized from ethyl acetate.

B.

Employing the same procedure, 4-octylthio-4'-nitro1,2-diphenylethylene is converted to 4-octylthio-4'-nitrodiphenylacetylene.

C.

Employing the same procedure, 4-hexadecyloxy-4'-nitro-1,2-diphenylethylene is converted to 4-hexadecyloxy-4'-nitrodiphenylacetylene.

D.

Employing the same procedure, 4-ethoxy-4'-cyano-1,2-diphenylethylene is converted to 4-ethoxy-4'-cyanodiphenylacetylene.

EXAMPLE IV

This Example illustrates the production of organopolysiloxane polymers in accordance with the present invention.

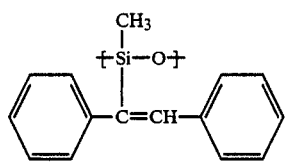

A 6.0 gram quantity of diphenylacetylene (33.7 mmoles) is dissolved in 45 ml of dry toluene in a 100 ml round bottomed flask equipped with a stirrer, and then 2 grams of polymethylhydrosiloxane (33.3 mmoles of reactive sites) is added. The reaction medium is heated to reflux to degass the flask with vapors. The flask is then stoppered with a syringe septum, and maintained at 60° C. with stirring.

One drop of chloroplatinic acid solution (0.5M platinum IV chloride in dry 2-propanol) is introduced to the stirring solution via a 25 microliter syringe (about 3–4 microliters). The reaction mixture is stirred for 16 hours at 60° C.

After cooling the product solution is filtered through a fluted filter paper into an excess of ice-cold methanol (about 1 liter). The crude polymer product is a viscous off-white precipitate which gradually coagulates on standing in the methanol medium. The methanol is decanted, and the residual crude polymer product is redissolved in toluene and the methanol precipitation procedure is repeated. The recovered polymer is dried in a vacuum oven at 120° C. for one hour. The final product is a clear hard glassy polymer which readily subdivides into small pieces.

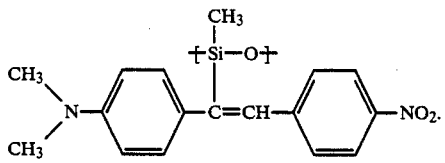

Employing the same procedure, 0.5 gram (1.88 mmoles) of 4-N,N-dimethylamino-4'-nitrodiphenylacetylene is reacted with 0.11 gram of polymethylhydrosiloxane (1.83 hydrogen equivalents).

After two precipitations in methanol solvent as described in section A above, the resultant viscous red polymer is dissolved in dichloromethane. The solvent is allowed to evaporate off at room temperature, and the resultant polymer product is dried in a 120° C. vacuum oven.

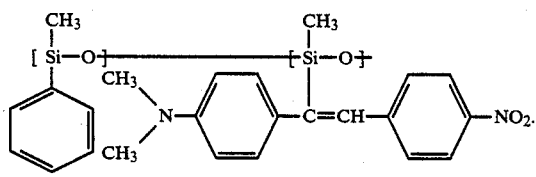

Following the same procedure, 1.0 gram (3.76 mmoles) of 4-N,N-dimethylamino-4'-nitrodiphenylacetylene and 0.72 gram (2.8 mmoles) of a 50:50 copolymer of methylphenylsiloxane and methylhydrosiloxane are reacted to form the above illustrated organopolysiloxane polymer.

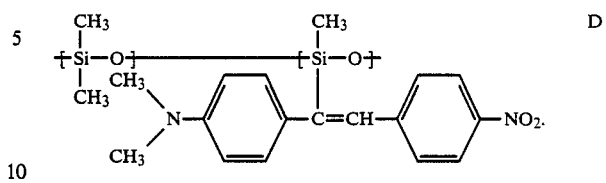

Following the same procedure, 1.0 gram (3.76 mmoles) of 4-N,N-dimethylamino-4'-nitrodiphenylacetylene and 0.45 gram (3.36 mmoles) of a copolymer of dimethylsiloxane and methylhydrosiloxane are reacted to form the above illustrated organopolysiloxane polymer.

The polymer precipitations are conducted in a hexane solvent, because the polymer is soluble in the methanol solvent employed in the above preparations.

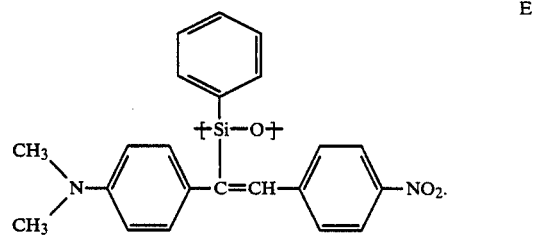

Following the same procedure, 1.0 gram (3.76 mmoles) of 4-N,N-dimethylamino-4'-nitrodiphenylacetylene and 0.41 gram (3.37 mmoles) of polyphenylhydrosiloxane are reacted to form the above illustrated organopolysiloxane polymer.

EXAMPLE V

This Example illustrates the preparation of a thin substrate of polysiloxane polymer with a macroscopic noncentrosymmetric molecular orientation in accordance with the present invention.

A polysiloxane polymer prepared in accordance with Example IV is compression molded to form a film of about 500 micron thickness.

The molding is accomplished in a 30 Ton press (Wabash Metal Products, Inc. Model #30-1010-2TMX) with programmed heating and cooling, and adjustable pressure. The platen temperature is set at 200° C. The polymer in particulate form is placed between two Kapton (DuPont polyimide) sheets and positioned between the two platens. The platens are closed and 6 tons pressure is applied for 2 minutes. The platens are then cooled, the pressure is released, and the film sample is retrieved from the press.

X-ray diffraction patterns from this transparent film sample, recorded by using nickel filtered $CuK_\alpha$ radiation and flat plate photographic techniques, indicate a random orientation of polymer molecule axes. The film exhibits a third order nonlinear optical response.

Molecular alignment of the polymer molecule axes is achieved in the following manner. The film sample is sandwiched between two Kapton films of 0.002 inch thickness which in turn are sandwiched between two metal plates of 0.25 inch thickness, each having a ground flat surface and a rod attached to one side which serves as a contact for application of voltage in the alignment procedure. The sub-assembly is covered on top and bottom with a double layer of Kapton sheets of 0.002 inch thickness and providing a 0.004 inch electrical insulating layer against each platen.

The whole assembly is placed between the platens of the press previously employed for preparing the unoriented precursor film sample. The platens are preheated to 200° C., then closed and a pressure of 6 tons is applied. Wires from a DC power supply are attached to the rods of the electrode plates and a voltage of 700 V is app)ied for two hours while maintaining temperature and pressure.

The press is cooled while pressure and voltage are maintained, then the voltage is reduced to zero and the pressure released. The molecularly aligned film sample is retrieved from the mold, and X-ray diffraction patterns are recorded with nickel filtered $CuK_\alpha$ radiation and wide-angle photographic flat plate techniques. Orientation functions are determined utilizing a polar table and a microdensitometer interfaced with a LeCray computer.

The data demonstrate that the molecular alignment process results in a rotation of essentially all of the molecular axes of the polymer molecules out of the film plane into a direction parallel to that of the external field. This type of molecularly aligned polysiloxane film is noncentrosymmetric and can function as a second-order harmonic-generating nonlinear optical medium for a high intensity light field to which the medium is optically clear, e.g., as the nonlinear optical component in a laser frequency converter device, with a $\chi^{(2)}$ susceptibility of at least about $1 \times 10^{-7}$ esu and a Miller's delta of at least about one square meter/coulomb.

EXAMPLE VI

This Example illustrates the preparation of poly[6-(4-nitrobiphenyloxy)hexyl methacrylate].

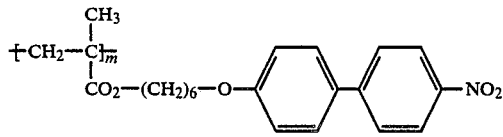

A. 4-Hydroxy-4'-nitrobiphenyl (1) 4-benzoyloxybiphenyl

To 500 ml of pyridine in a 1000 ml three-neck flask is added 170 g of 4-hydroxybiphenyl. The mixture is cooled to 10° C., and 155 g of benzoyl chloride is added dropwise while keeping the mixture temperature below 20° C. After complete addition, the mixture is heated gradually to reflux and maintained at this temperature for 30 minutes. The reaction mixture is then cooled to room temperature.

The solidified product subsequently is admixed with 250 ml HCl and 250 ml water, then additional HCl and water are added and the slurry is mixed thoroughly in a blender. The particulate solid is filtered, washed with water to a neutral pH, and air-dried overnight. The crude product is recrystallized from n-butanol, mp 149°–150° C.

(2) 4-benzoyloxy-4'-nitrobiphenyl

4-Benzoyloxybiphenol (40 g) is mixed with 310 ml of glacial acetic acid and heated to 85° C. Fuming nitric acid (100 ml) is added slowly while maintaining the reaction medium temperature between 85°–90° C. After complete addition, the reaction is cooled to room temperature.

The resultant solid is filtered and washed with water and methanol. The crude product is recrystallized from glacial acetic acid, mp 211°–214° C.

(3) 4-Hydroxy-4'-nitrobiphenyl

4-Benzoxyloxy-4'-nitrobiphenyl (60 g) is mixed with 300 ml of ethanol and heated to reflux. A solution of 40 g KOH in 100 ml of water is added dropwise at reflux. After complete addition, the mixture is refluxed 30 minutes and cooled overnight. The resultant blue crystalline potassium salt is filtered and dried.

The dried salt is dissolved in a minimum amount of boiling water, and a 50/50 HCl/water solution is added until an acidic pH is obtained. The crude yellow product is filtered and washed with water until neutral, and then recrystallized from ethanol, mp 203°–204° C.

B. 4-(6-Hydroxyhexyloxy)-4,-nitrobiphenyl

To 400 ml of ethanol is added 21.5 g of 4-hydroxy-4'-nitrobiphenyl and the mixture is heated to reflux. A solution of 7.1 g of KOH in 30 ml of water is added dropwise at reflux temperature. After complete addition, a 21.7 g quantity of 6-bromohexanol is added, and the reaction medium is refluxed about 15 hours. Then the reaction medium is cooled and the ethanol is removed in a rotary evaporator.

The solid residue is slurried with water in a blender and the particulate solid is filtered, washed with water, and air dried. The crude product is recrystallized from ethanol, mp 117°–119° C.

C. 4-(6-Methacryloxyhexyloxy)-4'-nitrobiphenyl 4-(6-Hydroxyhexyloxy)-4'-nitrobiphenyl (22 g) is dissolved in 500 ml of dry dioxane and heated to 45° C. A 14 g quantity of triethylamine is added, then a solution of 10.5 g of methacryloyl chloride in an equal volume of dioxane is added dropwise while maintaining the reaction medium temperature at 45° C.

The reaction medium is stirred at 45° C. for about 24 hours. The dioxane then is removed under vacuum, and the solid residue is slurried in water in a blender. The particulate solid is filtered, washed with water, and air dried. The crude monomer product is recrystallized from ethanol, mp 53°–56° C.

D. Poly[6-(4-nitrobiphenyloxy)hexyl methacrylate]

The monomer (2 g) is dissolved in 20 ml of degassed benzene in a reactor, and 1 mole percent of azodiisobutyronitrile is added to the reaction medium. The reactor is heated at 60° C. for 4 days. During this period, polymer product separates as a solid precipitate from the reaction medium. After the polymerization is completed, the precipitate is recovered and slurried with methanol in a blender. The solid polymer is filtered, washed with methanol, and vacuum dried.

EXAMPLE VII

This Example illustrates a poling procedure for producing a second order nonlinear optical medium of polysiloxane and liquid crystalline components in accordance with the present invention.

A. Poling Cell Construction

A poling cell is constructed from electrically conductive glass plates, such as Donnelly Mirror PD 5007-7. The glass plates are washed with sulfuric acid, isopropanol, 1-dodecanol, and isopropanol, with a distilled water rinse between each washing step.

The poling cell is a sandwich type cell in which the conductive glass surfaces are in facing proximity and are separated by a polyimide film of approximately 25 micrometer thickness. A thin layer of epoxy adhesive is applied on the surfaces of the polyimide film to hold the glass plates.

After the epoxy is completely cured, the cell is washed with isopropanol and rinsed with distilled water. After drying, the cell is stored in a dry box.

B. Filling The Poling Cell

A mixture of polysiloxane of Example I (30 weight %) and poly[6-(4-nitrobiphenyloxy)hexyl methacrylate] of Example V (70 weight %) is placed in a vacuum oven and maintained in a melt phase at a temperature of about 150° C. for about 4 hours to eliminate entrained air bubbles from the polymer melt.

The melt phase polymer blend is introduced into the space between the glass plates by charging a drop of the polymer melt to one of the openings of the poling cell space and placing the cell assembly in a vacuum oven maintained at a temperature approximately 10° C. above the clearing temperature of the polymer blend. The cell space fills gradually by capillary action. The space filling period is about 4 hours for a 0.5 cm long space. The polymer melt in the filled cell is bubble-free.

C. Electric Field Induced Orientation

Two lead wires are attached to each of the conductive glass surfaces using electrically conductive epoxy adhesive. The poling assembly is placed in a microscope hot stage (Mettler FP-82 with FP-80 Central Processor), and the sample is observed with a polarizing microscope (Leitz Ortholux Pol) for alignment.

The microscope is switched into a photodiode (Mettler Photometer No. 17517) to record the change of light intensity upon application of an electric field. The two lead wires are connected to an AC voltage amplifier (Electro-Optic Developments LA10A), which amplifies the voltage signal from a signal generator (Hewlett-Packard No. 3310B).

The poling cell first is heated to bring the polymer blend to the isotropic phase. The assembly then is cooled at a rate of 0.2° C./min. until the photodiode signal registers an abrupt increase which indicates that the melt has undergone a transition into a liquid crystalline phase. The temperature is further lowered by 2° C. and then maintained at this temperature.

The AC voltage source is set at 500 V, and the frequency is set at 2000 Hz. The power to the poling cell is turned on to apply an electric field across the polymer blend sample. The field strength is calculated to be approximately $2 \times 10^5$ V/cm. About three seconds after the electric field is applied, depending on the composition of the polymer blend the photodiode signal drops close to the baseline, indicating that orientation development induced by the electric field is completed. At this point, the cooling is resumed until the temperature reaches 35° C., and the poling assembly is disconnected from the power source.

When the poling assembly is removed from the microscope hot stage, by visual observation the polymer blend in the cell space is transparent. This is an indication that the molecular orientation is uniform and homogeneous throughout the sample. Orientation of the sample is further ascertained utilizing a wide angle X-ray diffraction technique, and the Hermann's orientation factor of the sample is approximately 0.9.

D. High Field Poling For Symmetry Control

The oriented polymer blend sample is subjected further to a higher electric field to develop a noncentrosymmetric orientation of nonlinear optical moieties which are a part of the side chains of the two polymer types.

The poling cell assembly is heated until it is approximately 5° C. below the glass transition temperature of the polymer blend. Then the lead wires of the poling assembly are connected to a DC voltage source (Kepco OPS-3500) and the voltage is turned up slowly until it reaches 2000 V. At this point, the electric field strength across the sample is about $8 \times 10^5$ V/cm. The sample is maintained at this field strength level for 10 hours, then the sample is cooled and the voltage source is disconnected. A noncentrosymmetrically oriented polymer blend matrix is obtained in this manner.

From the measurements, there is an indication that a major proportion of the nonlinear optical moieties are aligned parallel to the electric field direction, and the rest are oriented antpparallel to the electric field direction.

What is claimed is:

1. A polymer which is characterized by a recurring structural unit corresponding to the formula:

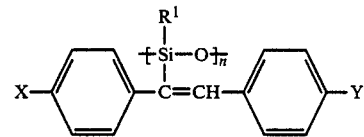

where $R^1$ is a hydrocarbyl substituent containing between about 1–12 carbon atoms; n is an integer of at least 5; X is an electron-donating substituent; and Y is an electron-withdrawing substituent.

2. A polymer in accordance with claim 1 wherein $R^1$ is a $C_1$–$C_4$ alkyl group.

3. A polymer in accordance with claim 1 wherein $R^1$ is a $C_6$–$C_{10}$ aryl group.

4. A polymer in accordance with claim 1 wherein X is a $C_1$–$C_{30}$ hydrocarbyl, hydrocarbyloxy or hydrocarbylthio group.

5. A polymer in accordance with claim 1 wherein X is an amino group.

6. A polymer in accordance with claim 1 wherein Y is a nitro group.

7. A polymer in accordance with claim 1 wherein Y is a cyano group.

8. A polymer in accordance with claim 1 wherein Y is a trifluoromethyl group.

9. A thermoplastic polymer which is characterized by a recurring structural unit corresponding to the formula:

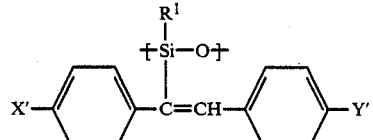

where R¹ is a hydrocarbyl substituent containing between about 1–12 carbon atoms; X' is a C₁–C₃₀ alkyl, alkoxy or alkylthio substituent; Y' is a substituent selected from the group consisting of nitro, cyano and trifluoromethyl substituents; and the polymer contains between about 5–2000 silicon atoms.

10. A thermoplastic polymer which is characterized by a recurring structural unit corresponding to the formula:

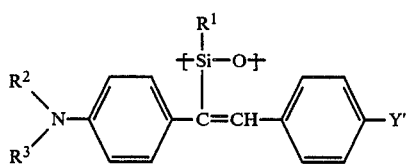

where R¹ is a hydrocarbyl substituent containing between about 1–12 carbon atoms; R² and R³ are selected from the group consisting of hydrogen and C₁–C₃₀ alkyl substituents, and R² and R³ taken with the connecting nitrogen atom form a heterocyclic substituent; Y' is a substituent selected from the group consisting of nitro, cyano and trifluoromethyl substituents; and the polymer contains between about 5–2000 silicon atoms.

11. A polymer in accordance with claim 10 wherein R¹ is methyl.

12. A polymer in accordance with claim 10 wherein the R¹ substituent is phenyl.

13. A polymer in accordance with claim 10 wherein the R² and R³ groups are each methyl.

14. A polymer in accordance with claim 10 wherein the R² group is hydrogen and the R³ group is n-hexadecyl.

15. A polymer in accordance with claim 10 wherein the R² and R³ groups taken together with the connecting nitrogen atom is pyrrolidyl.

16. A polymer in accordance with claim 10 wherein the Y' substituent is nitro.

17. A polymer in accordance with claim 10 wherein the Y' substituent is cyano.

18. A polymer in accordance with claim 10 wherein the Y' substituent is trifluoromethyl.

19. A polymer which is characterized by a recurring structural unit corresponding to the formula:

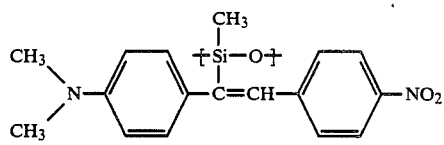

wherein the polymer has a weight average molecular weight between about 2000–100,000.

20. A polymer which is characterized by a recurring unit corresponding to the formula:

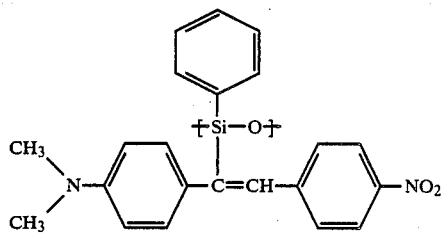

wherein the polymer has a weight average molecular weight between about 2000–100,000.

21. A polymer which is characterized by a recurring structural unit corresponding to the formula:

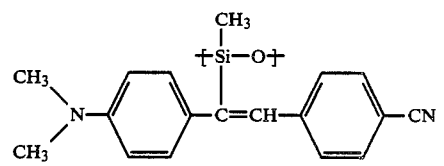

wherein the polymer has a weight average molecular weight between about 2000–100,000.

22. A polymer which is characterized by a recurring structural unit corresponding to the formula:

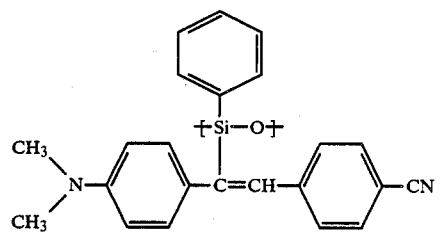

wherein the polymer has a weight average molecular weight between about 2000–100,000.

* * * * *